United States Patent
Kobayashi et al.

(10) Patent No.: US 6,512,723 B2
(45) Date of Patent: Jan. 28, 2003

(54) INFORMATION STORAGE APPARATUS HAVING SELECTIVE STORAGE MEDIUM ROTATION STOP OPERATION

(75) Inventors: Shinya Kobayashi, Kawasaki (JP); Shigenori Yanagi, Kawasaki (JP); Hideshi Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 09/741,555

(22) Filed: Dec. 19, 2000

(65) Prior Publication Data

US 2001/0040847 A1 Nov. 15, 2001

(30) Foreign Application Priority Data

May 11, 2000 (JP) ........................................ 2000-138710

(51) Int. Cl.$^7$ .................................................. G11B 3/90
(52) U.S. Cl. ........................ 369/53.3; 369/235; 369/237
(58) Field of Search .......................... 369/47.38, 47.39, 369/47.45, 47.55, 53.3, 79, 234, 235, 237, 268

(56) References Cited

U.S. PATENT DOCUMENTS 4,815,063 A * 3/1989 Aoshima et al. ......... 369/47.45
5,025,437 A * 6/1991 Yamashita et al. ............ 369/79

FOREIGN PATENT DOCUMENTS

| JP | 63-108562 A | 5/1988 |
| JP | 05-198082 | 8/1993 |

* cited by examiner

Primary Examiner—Paul W. Huber
(74) Attorney, Agent, or Firm—Greer, Burns & Crain, Ltd.

(57) ABSTRACT

There is disclosed an information storage apparatus with a low current consumption in a spindle motor or the like. A spindle motor driver 38 and spindle motor 40 serve as both a driver for driving a disk-like information storage medium in a predetermined direction and a brake for forcibly stopping rotation of the information storage medium, and by appropriately inputting, to the spindle motor driver 38, a spindle-on signal SPDLON for operating the spindle motor driver 38 and spindle motor 40 as the driver and a brake signal BRAKE for operation as the brake, MPU selectively uses a forced stop operation for stopping driving the information storage medium to forcibly stop the information storage medium, and a natural stop operation in which the spindle motor 40 simply stops driving the information storage medium.

2 Claims, 13 Drawing Sheets

INFORMATION STORAGE APPARATUS HAVING SELECTIVE STORAGE MEDIUM ROTATION STOP OPERATION

BACKGROUND OF THE INVENTION i) Field of the Invention

The present invention relates to an information storage apparatus in which an information storage medium is used.

ii) Description of Related Art

Information storage apparatuses such as a hard disk drive and a magnetooptic (MO) disk drive have heretofore been known, and in the information storage apparatus, a disk-like information storage medium is used. The information storage apparatus is incorporated into a computer system as the information storage apparatus for a computer in many cases.

In recent years, information communication networks such as Internet have rapidly been developed, and with the development, portable computer systems such as a notebook-isize personal computer have also been developed. When the aforementioned information storage apparatus is incorporated and utilized in the portable computer system, it is necessary to operate the information storage apparatus by a battery or a galvanic cell. Moreover, in order to lengthen life of the battery or the galvanic cell, and construct the portable computer system which can be utilized for a long time, development of the information storage apparatus with a little current consumption has strongly been demanded.

Additionally, in the information storage apparatus, the information storage medium is rotated at a high speed by a spindle motor or the like to access the information storage medium, and the current consumption in the spindle motor occupies a large proportion of the current consumption of the information storage apparatus. Therefore, it is an important problem to reduce the current consumption in the spindle-motor or the like.

This problem is a particularly remarkable problem when the apparatus is incorporated into the portable computer system, but also occurs when the apparatus is incorporated in a desktop computer system, or when the apparatus has its own power source.

SUMMARY OF THE INVENTION

The present invention has been developed in consideration of the aforementioned circumstances, and an object thereof is to provide an information storage apparatus in which current consumption in a spindle motor or the like is low. By realizing such information storage apparatus, it is possible to construct a portable computer system whose long-time use is possible with a battery or a galvanic cell.

To achieve the aforementioned object, according to the present invention there is provided an information storage apparatus for holding an information storage medium in a predetermined position and rotating the information storage medium in a predetermined direction to perform at least information reproduction with respect to the information storage medium.

The information storage apparatus comprises: a driver for driving the information storage medium in the predetermined direction; a brake for forcibly stopping rotating the information storage medium; and a controller for selectively executing a forced stop operation in which the driver stops driving the information storage medium and the brake forcibly stops rotating the information storage medium, and a natural stop operation in which the driver only stops driving the information storage medium.

Here, the "information storage medium" includes an optical disk, a flexible disk and a hard disk, and further includes non-disk-like information storage media such as a card-like information storage medium. Moreover, the "information storage medium" may be either a transportable medium or a built-in medium.

The forced stop operation consumes more current than the natural stop operation because the operation of the brake is necessary. Therefore, by appropriately and selectively executing the forced stop operation and the natural stop operation by the information storage apparatus of the present invention to avoid a wasteful forced stop operation, current consumption can be depressed.

For the information storage apparatus of the present invention, with the transportable information storage medium, it is preferable that "the information storage apparatus further comprises: an ejector for ejecting the information storage medium out of the predetermined position; and a judgment section for judging whether a state of the information storage medium is a rotating state or a stop state, and the controller not only selectively (uses and) executes the forced stop operation and the natural stop operation but also allows the ejector to execute an eject operation for ejecting the information storage medium, and in order to execute the eject operation, the controller executes the forced stop operation to stop the information storage medium and subsequently executes the eject operation in a case in which the judgment section judges that the state is the rotating state, and executes the eject operation as it is in a case in which the judgment section judges that the state is the stop state".

Here, the judgment section may judge that the state is the stop state when a time elapsed from a time to execute the forced stop operation and the natural stop operation is longer than a predetermined time, or may judge that the state is the stop state when a result of measurement of a rotational speed of the information storage medium or the driver is a predetermined rotational speed or less.

According to the information storage apparatus of the aforementioned preferable constitution, when the information storage medium is in the rotating state, the forced stop operation is executed, the information storage medium is prevented from being damaged during ejecting of the information storage medium, and a standby time is conveniently short until the ejecting of the information storage medium. Moreover, when the information storage medium is in the stop state, a wasteful forced stop operation is avoided and the current consumption is small.

Moreover, in the information storage apparatus of the present invention, the controller receives a predetermined starting signal and allows the driver to start driving the information storage medium, and in a case in which the controller allows the natural stop operation to be executed and subsequently receives the starting signal before the information storage medium stops, the information storage medium fails to stop and the controller preferably allows the driver to start driving the information storage medium.

When the controller allows the natural stop operation to be executed, for a certain degree of time, the information storage medium continues rotating by inertia.

According to the information storage apparatus of the aforementioned preferable constitution, when the information storage medium continues rotating and the starting signal is received, the current consumption can be depressed by utilizing a rotation energy.

Furthermore, in the information storage apparatus of the aforementioned preferable constitution, when the information storage medium fails to stop and the controller allows the driver to start driving the information storage medium, the controller performs a control on the driver in accordance with the rotational speed of the information storage medium.

According to the information storage apparatus of the preferable constitution, by performing the control on the driver in accordance with the rotational speed, the rotation energy of the information storage medium is efficiently utilized.

DETAILED DESCRIPTION OF THE PREFERRED EMBODIMENTS

A preferred embodiment of the present invention will be described hereinafter.

Figure 1:
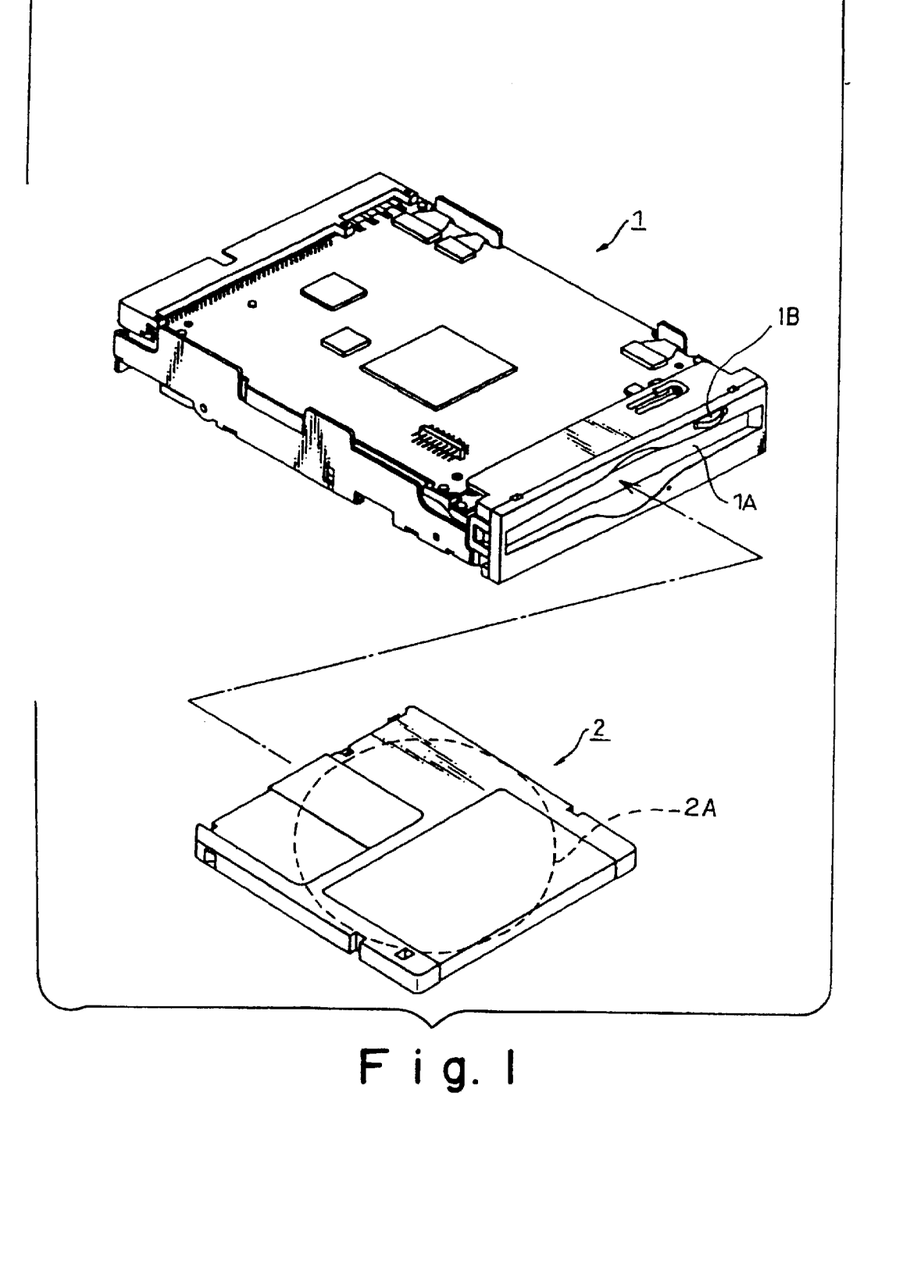
FIG. 1 is an appearance view of a magnetooptic (MO) disk drive according to one embodiment of an information storage apparatus of the present invention.

FIG. 1 is an appearance view of a magnetooptic (MO) disk drive according to one embodiment of an information storage apparatus of the present invention.

An MO disk drive 1 shown herein is incorporated in host apparatuses such as a personal computer, and a cartridge 2 is inserted into the MO disk drive 1 via an insertion port 1A. The cartridge 2 contains a magnetooptic (MO) disk 2A as one example of an information storage medium referred to in the present invention, and the MO disk drive 1 rotates the MO disk 2A in a predetermined forward direction to perform information recording and information reproduction with respect to the MO disk 2A. Moreover, in the MO disk drive 1 of the present embodiment, when an eject button 1B is pressed, a motor built in the MO disk drive 1 ejects the MO disk 2A with the cartridge 2 out of the apparatus.

Figure 2:
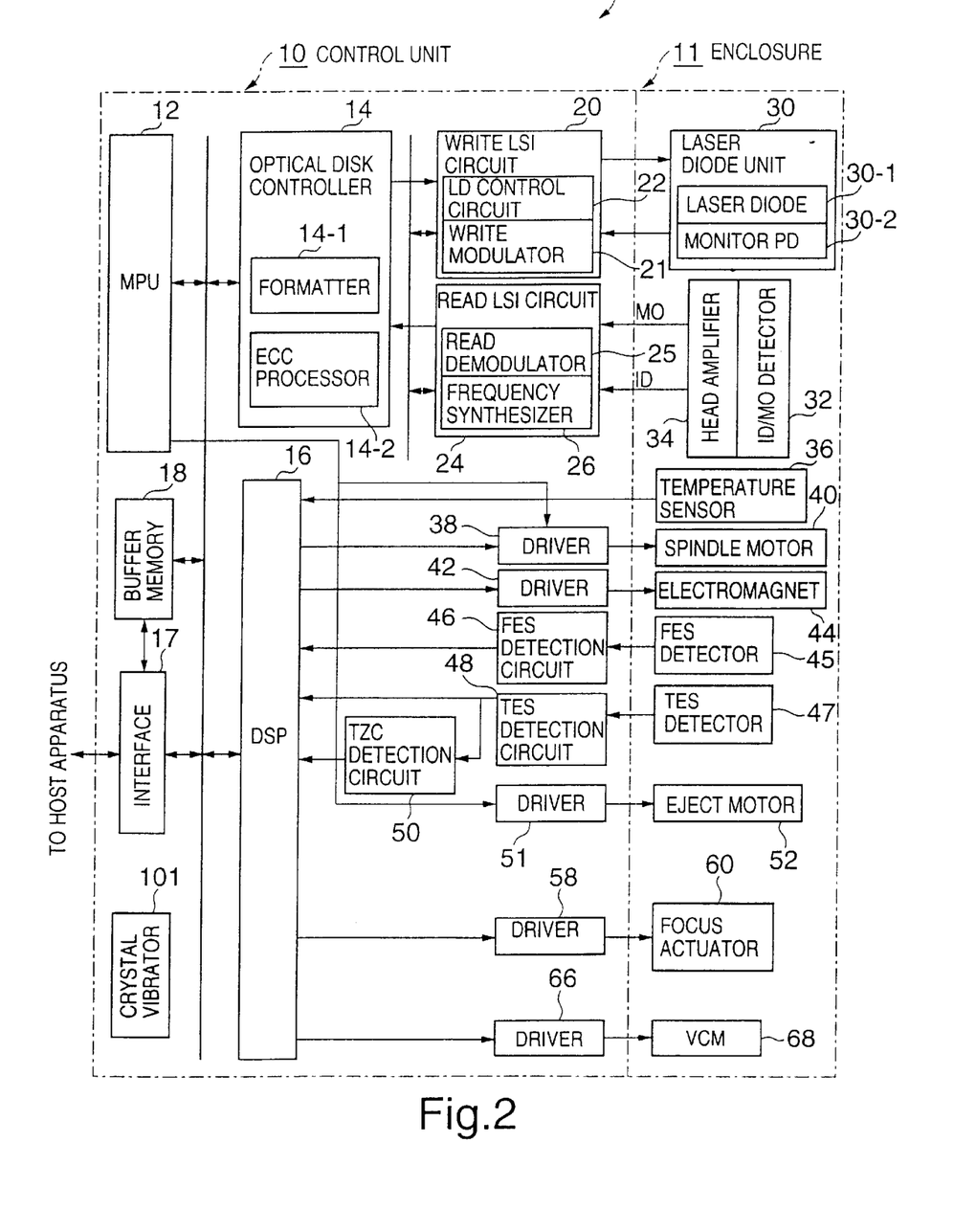
FIG. 2 is a block diagram showing an internal constitution of the MO disk drive.

FIG. 2 is a block diagram showing an internal constitution of the MO disk drive.

The MO disk drive 1 is largely divided to an enclosure 11, provided with the cartridge 2 shown in FIG. 1 inserted therein, for accessing the MO disk 2A in the cartridge 2, and a control unit 10 for controlling an operation of the enclosure 11.

The MO disk 2A of the cartridge 2 inserted in the enclosure 1 is held by a spindle motor 40. For the spindle motor 40, a drive current is supplied by a spindle motor driver 38 in accordance with a drive control signal emitted from a micro processor unit (MPU) 12, and rotating/driving of the MO disk 2A in the forward direction and forcible stopping of the MO disk 2A are performed. The MPU 12 is one example of a controller referred to in the present invention. Moreover, the spindle motor driver 38 and spindle motor 40 constitute one example of a driver referred to in the present invention, and the spindle motor driver 38 and spindle motor 40 also serve as one example of a brake referred to in the present invention.

When the eject button 1B shown in FIG. 1 is pressed, an eject signal is emitted from the MPU 12 and inputted to an eject motor driver 51, the eject motor driver 51 supplies a drive current to an eject motor 52, and the eject motor 52 ejects the MO disk 2A together with the cartridge 2 out of the MO disk drive 1. Therefore, the eject motor driver 51 and eject motor 52 constitute one example of an ejector referred to in the present invention.

Moreover, the enclosure 11 is provided with a laser diode unit 30, and during information reproduction, a laser diode 30_1 of the laser diode unit 30 emits a laser light of a predetermined intensity. The laser light intensity is controlled by a monitor photo diode 30_2 and a laser diode control circuit 22. Subsequently, the MO disk 2A is irradiated with the laser light by a focus optical system (not shown), and a reflected light is generated in accordance with information recorded on the MO disk 2A. The reflected light is received by an ID/MO detector 32 and ID and MO signals are detected. These ID and MO signals are amplified by a head amplifier 34, inputted to a read LSI circuit 24, modulated by a read demodulation circuit 25 in synchronism with a period signal generated by changing a period of a basic period signal of a crystal vibrator 101 by a frequency synthesizer 26, and converted to reproduction data. For the reproduction data, after an error is checked by an error correction code (ECC) processor 14_2 of an optical disk controller 14, the data is sent to a host apparatus via a buffer memory 18 and an interface 17.

On the other hand, during information recording, recording data is sent to the optical disk controller 14 from the host apparatus via the buffer memory 18 and interface 17. An error correction code is added to the recording data by the ECC processor 14_2 and the data is inputted to a write LSI circuit 20. Moreover, during formatting of the MO disk 2A, a formatter 14_1 of the optical disk controller 14 generates format data and inputs the data to the write LSI circuit 20. These recording and format data are modulated by a write modulation circuit 21 of the write LSI circuit 20 and converted to a write signal, the write signal is inputted to the laser diode unit 30, and the laser diode 30_1 emits the laser light in response to the write signal.

Moreover, during information recording and formatting, the MPU 12 transmits a magnetic field generation signal to a digital signal processor (DSP) 16. The DSP 16 controls a magnetic head driver 42 in response to the magnetic field generation signal and an output signal of a temperature sensor 36, the magnetic head driver 42 supplies a current to an electromagnet 44 of a magnetic head, and a recording magnetic field is generated on the MO disk 2A. Subsequently, the information is recorded on the MO disk 2A by the recording magnetic field and the laser light in response to the write signal, or the MO disk 2A is formatted.

Furthermore, the MO disk drive 1 is provided with a voice coil motor 68 to which a voice coil motor (VCM) driver 66 supplies the drive current to move an optical head with the focus optical system and the laser diode unit 30 mounted thereon along the surface of the MO disk 2A. The voice coil motor (VCM) driver 66 is controlled by the DSP 16 in response to TES and TZC detected from a detect signal obtained by a tracking error signal (TES) detector 47 by a TES detection circuit 48 and a tracking zero cross (TZC) detection circuit 50, and a seek signal emitted from the MPU 12.

Additionally, the MO disk drive 1 is also provided with a focus actuator 60 to which the drive current is supplied by a focus actuator driver 58 to drive the focus optical system. The focus actuator driver 58 is controlled by the DSP 16 in response to FES which is detected from the detect signal obtained by a focus error signal (FES) photo detector 45 by an FES detection circuit 46.

The spindle motor driver 38 and spindle motor 40 will next be described in detail which serve as both one example of the driver referred to in the present invention and one example of the brake referred to in the present invention.

Figure 3:
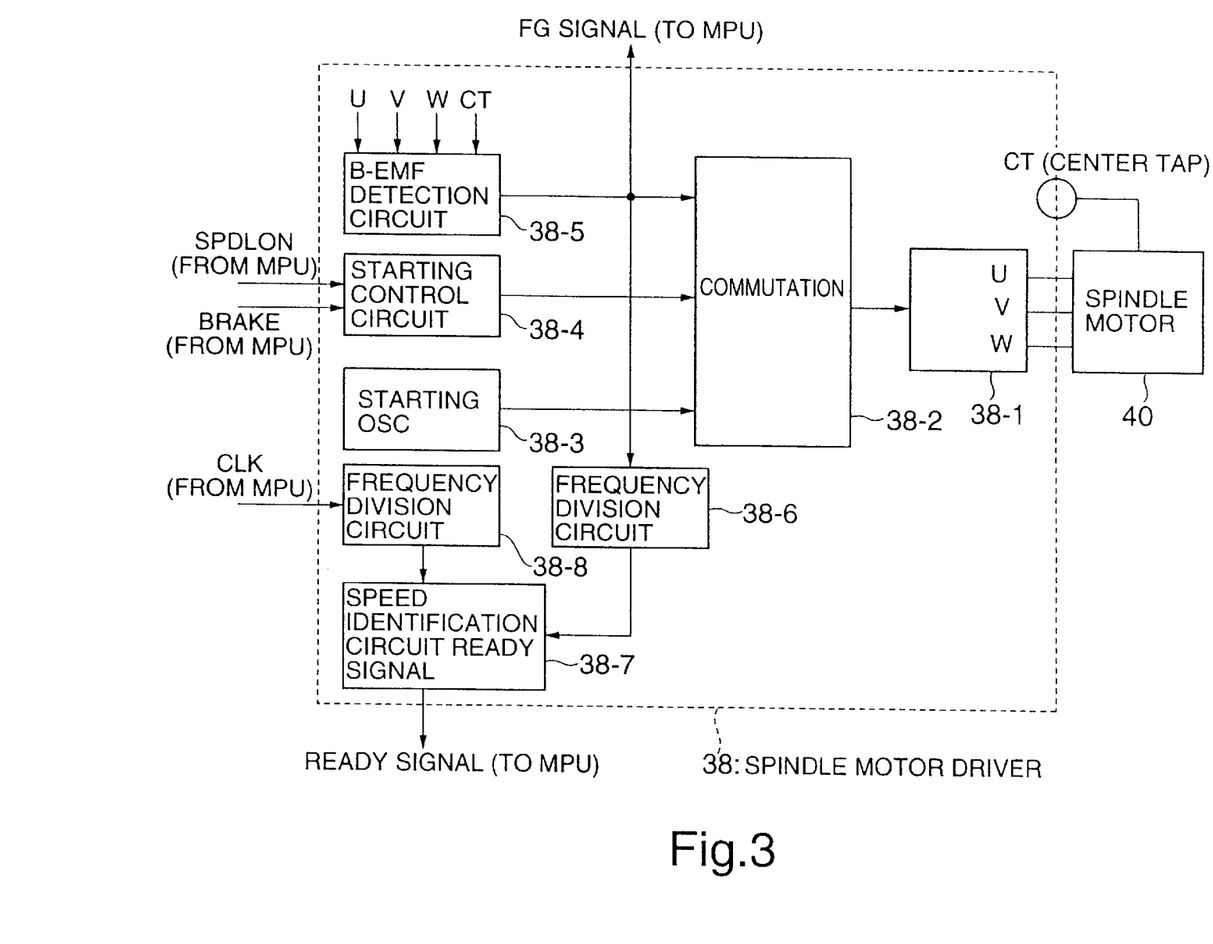
FIG. 3 is a block diagram of a spindle motor drive.

FIG. 3 is a block diagram of the spindle motor driver.

The spindle motor 40 rotates when the drive current is successively supplied to three phases of U, V, and W phases, and the spindle motor driver 38 is provided with a power source 38_1 for supplying the drive currents to the U, V, and W phases, respectively. Moreover, the spindle motor driver 38 is also provided with a commutation 38_2 for changing a current supply phase among U, V, and W phases in a circulating manner, and a starting oscillator (OSC) 38_3 for generating a starting period signal as a standard of a timing for changing the supply phase by the commutation 38_2.

Furthermore, the spindle motor driver 38 is also provided with a starting control circuit 38_4 for receiving the drive control signal from the MPU 12 (see FIG. 2), and indicating a change order of the supply phase to the commutation 38_2. On receiving a spindle-on signal SPDLON which is one example of a starting signal referred to in the present invention as the drive control signal, the starting control circuit 38_4 allows the commutation 38_2 to change the supply phase to the forward direction, and allows the spindle motor 40 to rotate/drive the MO disk 2A (see FIG. 1) in the forward direction. Moreover, on receiving a brake signal BRAKE as the drive control signal, the starting control circuit 38_4 allows the commutation 38_2 to change the supply phase to a backward direction opposite to the forward direction, and allows the spindle motor 40 to generate a drive force of the backward direction so that the MO disk 2A is forcibly stopped. Additionally, when neither the spindle-on signal SPDLON nor the brake signal BRAKE is inputted to the starting control circuit 38_4, current supply by the power source 38_1 stops, and the drive force of the spindle motor becomes "zero" in both the forward direction and the backward direction.

The spindle motor 40 inputs a back electromotive voltage for each of the U, V, and W phases, and a center tap voltage indicating a standard (0 V) of the back electromotive voltage to the spindle motor driver 38, and the back electromotive voltage and center tap voltage are inputted to a back electromotive voltage detection circuit 38_5. The back electromotive voltage detection circuit 38_5 outputs a period signal (FG signal) synchronous with the rotation of the spindle motor 40 based on the back electromotive voltage and center tap voltage.

Figure 4:
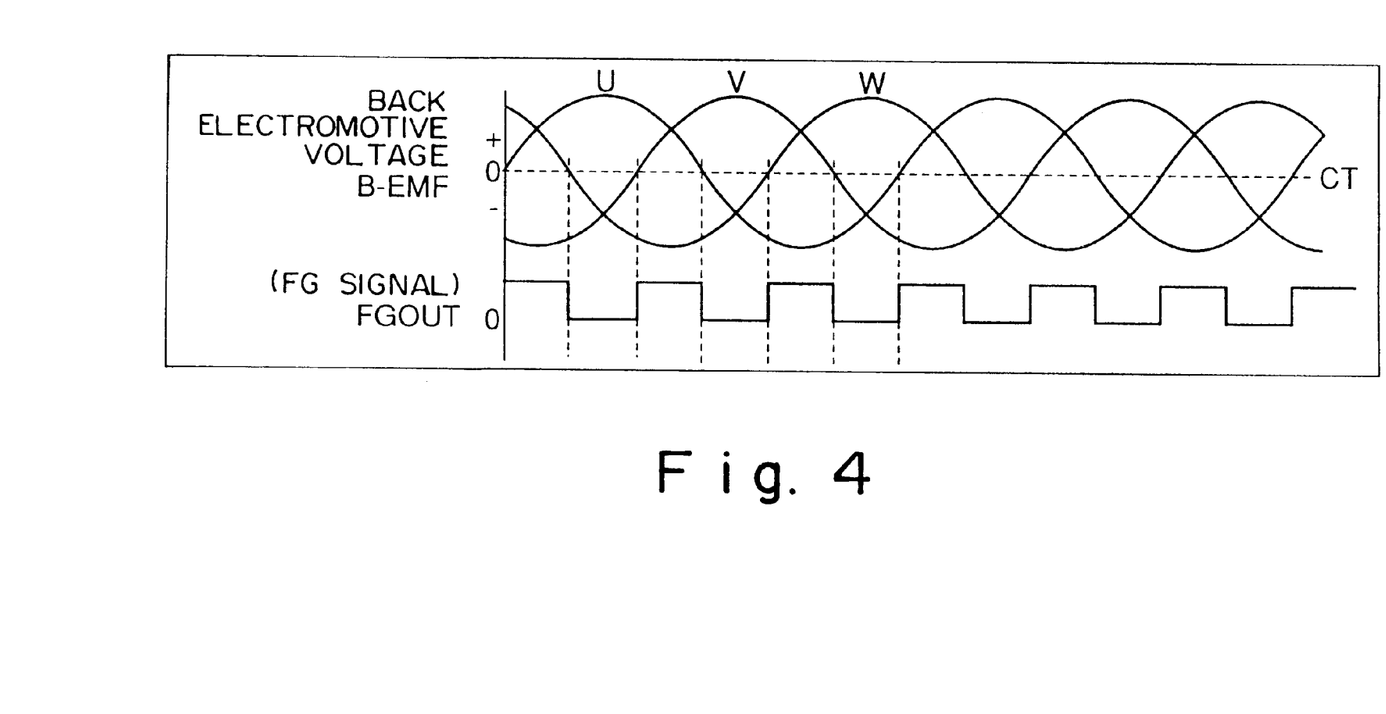
FIG. 4 is a graph showing an FG signal.

FIG. 4 is a graph showing the FG signal.

The abscissa of the graph indicates time, an upper part of the graph shows the back electromotive voltage for each of the U, V, and W phases with the center tap voltage being "0 V", and the back electromotive voltage has a sine waveform. Moreover, a lower part of the graph shows the FG signal, and the FG signal is a binary signal whose value is reversed every time the back electromotive voltage for each of the U, V, and W phases reaches a zero cross.

Turning back to FIG. 3, the description will continue.

The FG signal outputted from the back electromotive voltage detection circuit 38_5 is inputted to the MPU, the commutation 38_2, and a frequency division circuit 38_6. The frequency division circuit 38_6 frequency-divides the FG signal and inputs the signal to a speed identification circuit 38_7. Moreover, another frequency division circuit 38_8 receives a clock signal CLK from the MPU, frequency-divides the clock signal CLK, and inputs the signal to the speed identification circuit 38_7. The speed identification circuit 38_7 compares the signals inputted from the two frequency division circuits 38_6, 38_8 with each other to identify a rotational speed of the spindle motor 40, and outputs, to the MPU, a Ready signal of 'L' when the rotational speed is in a predetermined steady rotational speed range and of 'H' when the rotational speed is out of the range.

A general operation of the MO disk drive 1 shown in FIGS. 1 and 2 will next be described by noting the rotational speed (number of revolutions) of the MO disk.

Figure 5:
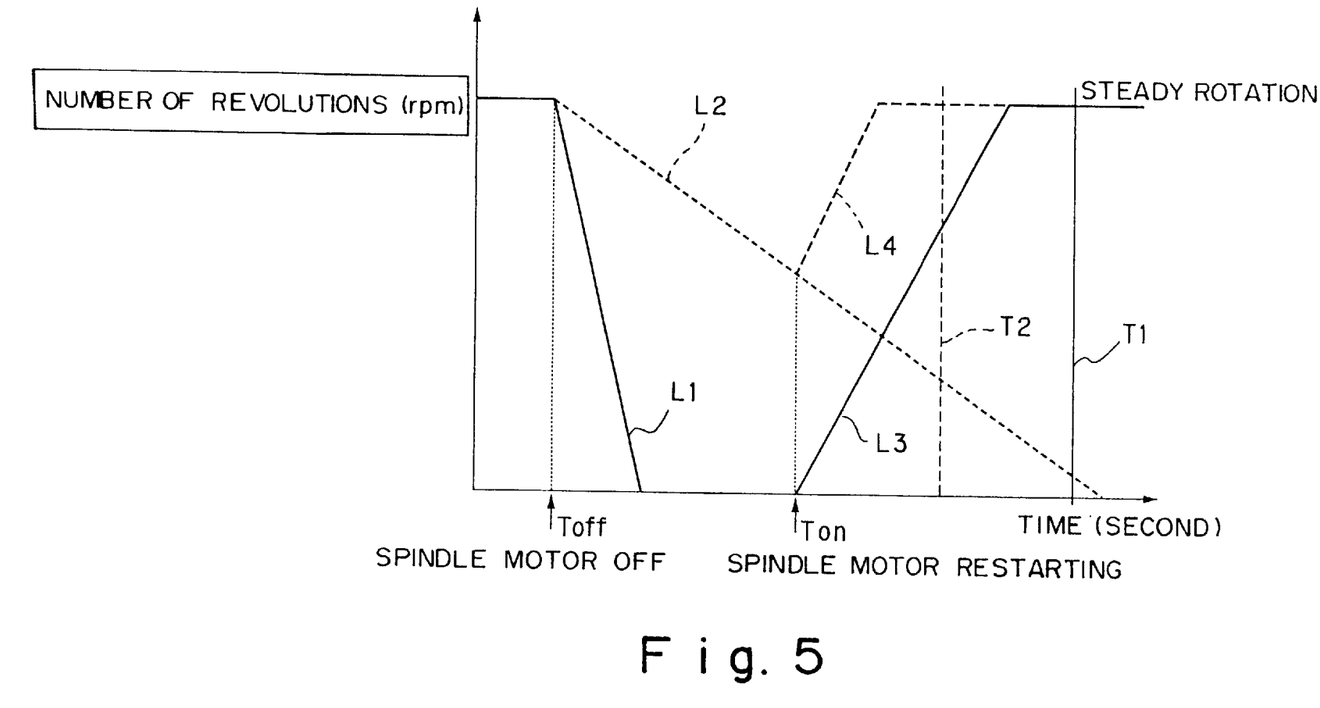
FIG. 5 is a graph schematically showing a change of rotational speed (number of revolutions) of the MO disk.

FIG. 5 is a graph schematically showing a change of the rotational speed (number of revolutions) of the MO disk during the operation of the MO disk drive 1.

The abscissa of the graph indicates time, and the ordinate indicates the rotational speed (number of revolutions).

To perform the information recording and information reproduction, the MO disk drive 1 rotates the MO disk at a steady rotational speed such as 3600 rpm and 4500 rpm. Moreover, when the cartridge of the MO disk is ejected out of the apparatus, the MO disk is stopped from this steady rotating state, but in the MO disk drive 1 the following two types of stop operations are selectively used.

A first type of stop operation is used when the cartridge of the MO disk is ejected out of the apparatus, and the spindle motor stops the driving of the forward direction and generates the drive force in the backward direction to forcibly stop the rotation of the MO disk. This stop operation will hereinafter be referred to as a forced stop operation.

A rightward descending solid line L1 in the graph of FIG. 5 shows the change of the rotational speed of the MO disk when the forced stop operation starts at time Toff, and the rotational speed rapidly drops.

Another stop operation is used in a sleep (low power consumption mode) processing in which the cartridge of the MO disk is held in the apparatus and the information recording and information reproduction are halted, and the spindle motor only stops the driving of the forward direction. In this operation, the spindle motor drive force turns to "0" in both the forward direction and the backward direction, and the MO disk continues to rotate for a while by inertia and subsequently naturally stops. This stop operation will hereinafter be referred to as a natural stop operation.

A rightward descending dotted line L2 in the graph of FIG. 5 shows the change of the rotational speed of the MO disk when the natural stop operation starts at the time Toff, and the rotational speed moderately drops as compared with the forced stop operation.

Such natural stop operation is employed in the present invention for the first time, and in the conventional MO disk drive or the like only the forced stop operation is employed.

Moreover, in MO disk drive 1, in a case in which restarting is performed to set the MO disk rotational speed back to the steady rotational speed after the stop operation, when the MO disk is in a stop state, the rotational speed is raised from the stop state to regain the steady rotational speed, and when the MO disk inertially rotates, the rotating state is kept and the rotational speed is raised to regain the steady rotational speed.

A rightward ascending solid line L3 in the graph of FIG. 5 shows the change of the rotational speed in a case in which restarting is started from the stop state at time Ton. Moreover, a rightward ascending dotted line L4 in the graph shows the change of the rotational speed in a case in which restarting is started from the rotating state at the time Ton.

This restarting operation is employed in the present invention for the first time, and in the conventional MO disk drive or the like, when the MO disk or the like is rotating for some reason, the forced stop operation is once executed to stop the MO disk, and subsequently the rotational speed is raised to the steady rotating state from the stop state.

Figure 6:
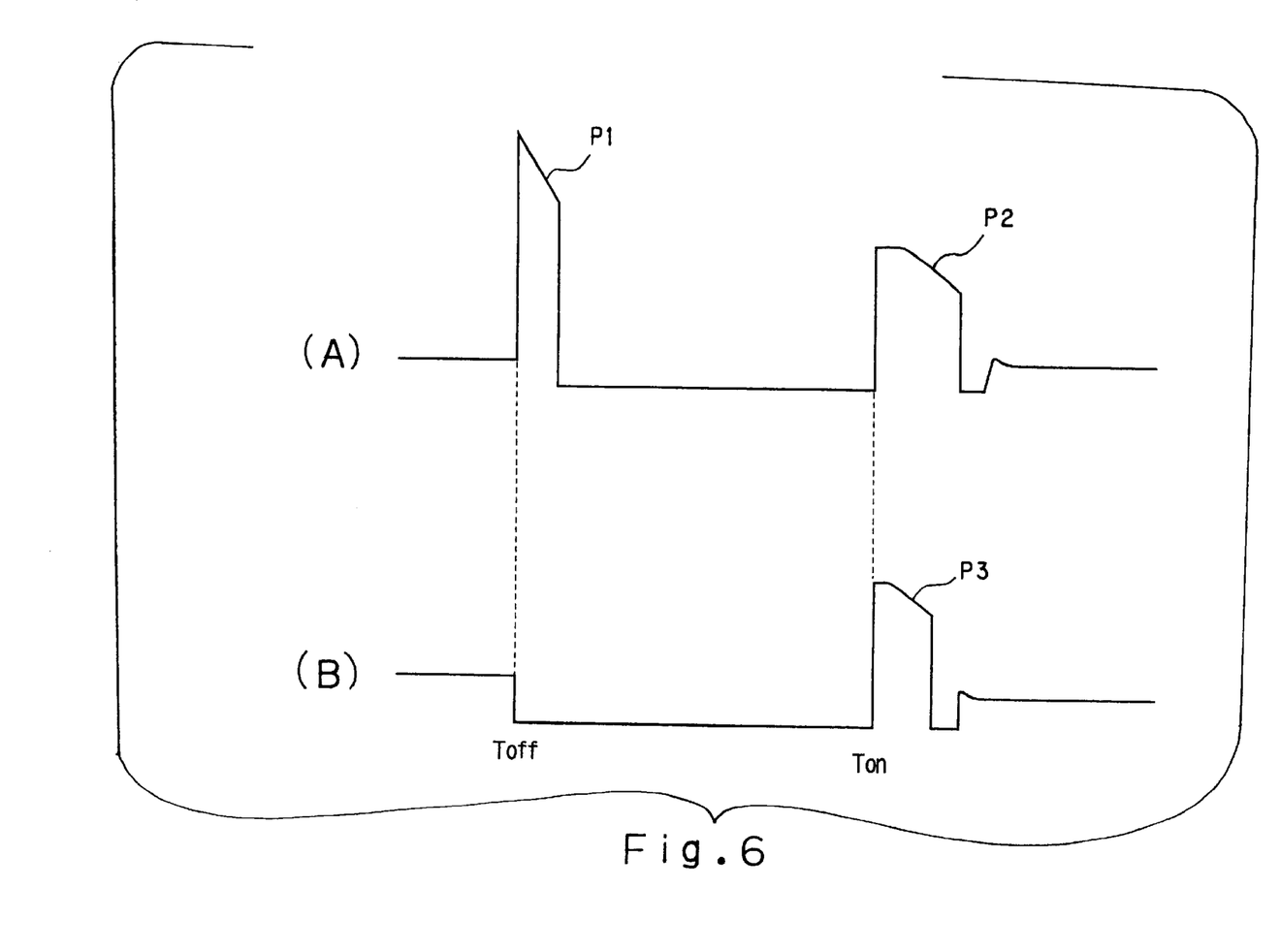
FIG. 6 shows graphs of current consumption in a stop operation and restarting.

FIG. 6 shows graphs of current consumption in the stop operation and restarting.

In the graph the abscissa indicates time, and the ordinate indicates the current consumption. Moreover, part (A) of FIG. 6 shows the graph of the current consumption generated in the operation represented by the solid lines L1, L3 of FIG. 5, and part(B) of FIG. 6 shows the graph of the current consumption generated in the operation represented by the dotted lines L2, L4 of FIG. 5.

When the stop operation starts at the time Toff, with the forced stop operation, a large current peak P1 for generating the drive force of the backward direction in the spindle motor is generated, but with the natural stop operation no current peak is generated. Therefore, the current consumption can be depressed by employing the natural stop operation when the forced stop operation is unnecessary.

Moreover, for current peaks P2, P3 generated during restarting at the time Ton, the current peak P2 generated by the restarting from the stop state is larger than the current peak P3 generated by the restarting from the rotating state. Specifically, the current consumption can be depressed by employing the operation of raising the rotational speed from the rotating state to perform the restarting.

An operation of the MO disk drive 1 shown in FIGS. 1 and 2 will next be described with reference to a flowchart.

Figure 7:
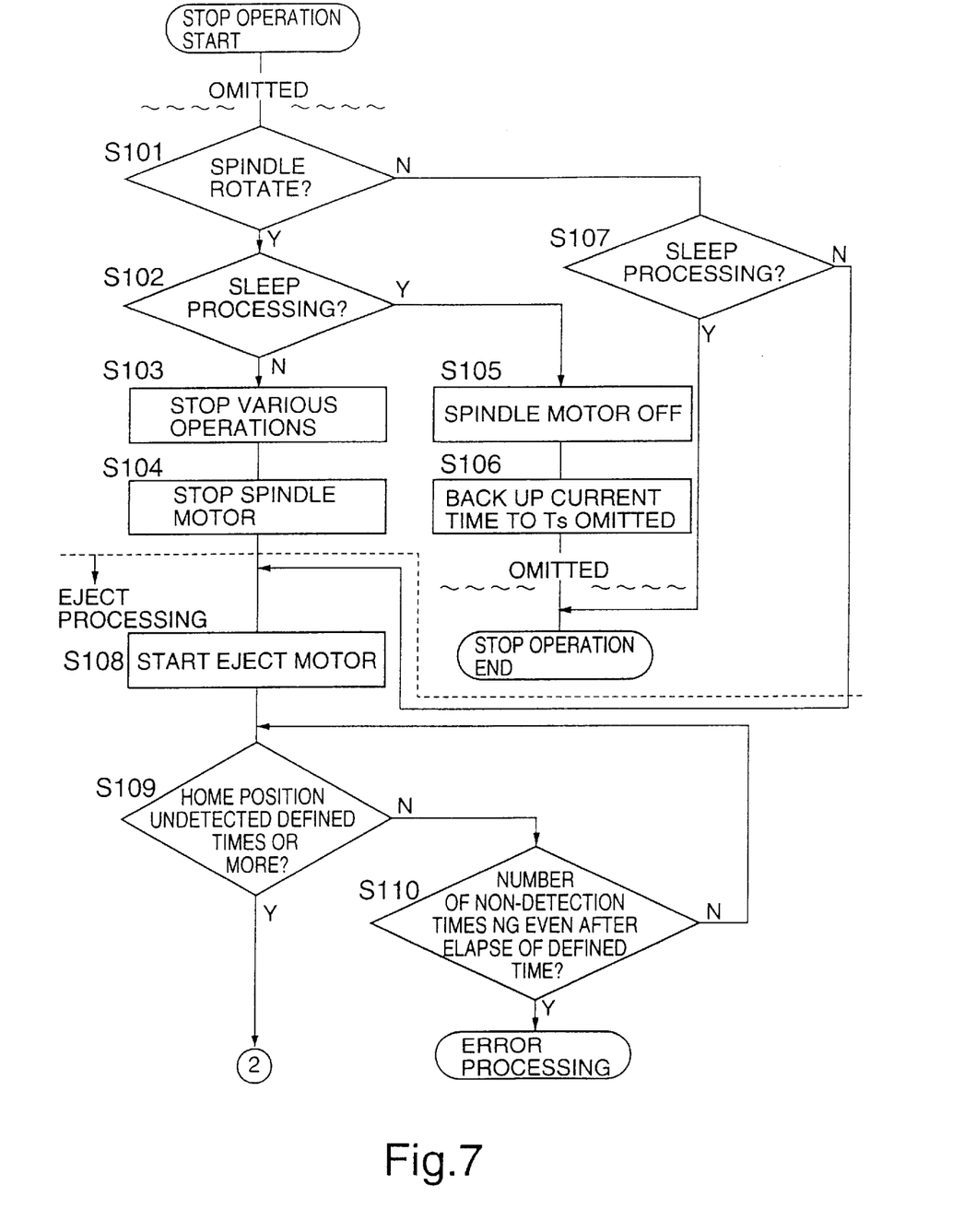
FIG. 7 shows a former step part of a flowchart of the stop operation.
Figure 8:
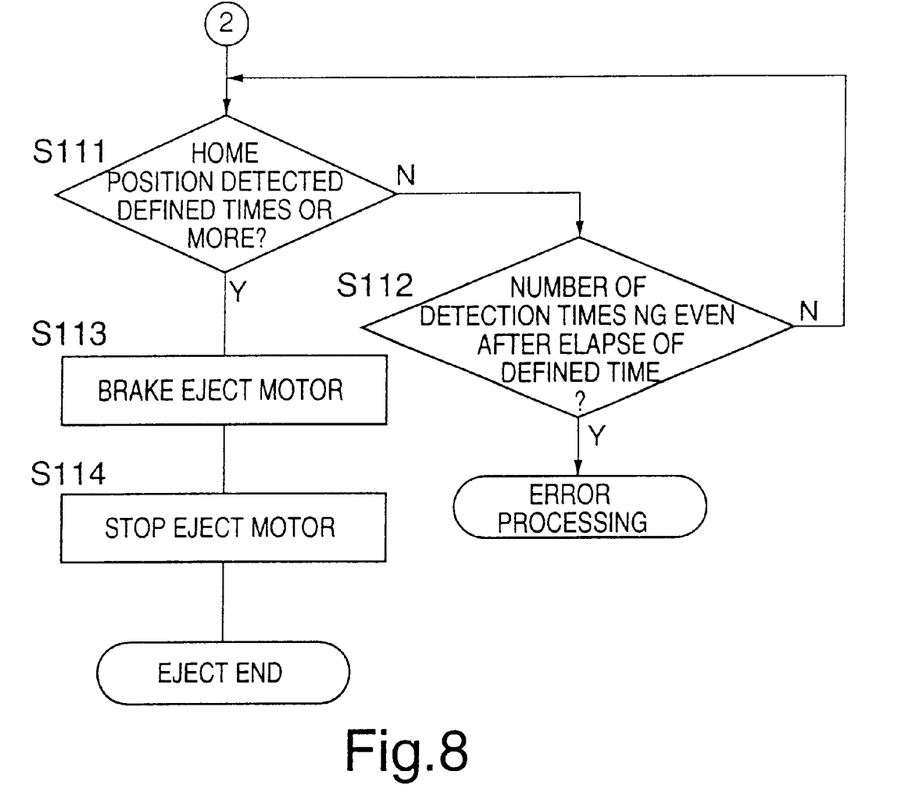
FIG. 8 shows a latter step part of the flowchart of the stop operation.

FIGS. 7 and 8 are flowcharts of the stop operation, and a flow continues to step S111 of FIG. 8 from step S109 of FIG. 7.

When the stop operation starts and the flow advances to step S101, it is judged whether or not the spindle motor and MO disk are in the rotating state. When it is judged that they are in the rotating state, it is judged whether or not a sleep processing is being performed (step S102), in a case in which it is judged that the sleep processing is being performed, the spindle motor is turned off and the natural stop operation is executed (step S105), the current time is backed up to a variable Ts as a start time of the natural stop operation (step S106). Thereafter, the stop operation ends.

When it is judged in the step S102 that the sleep processing is not being performed, that is, that preparations are being made for an eject processing, various operations in the MO disk drive are stopped (step S103), the drive force of the backward direction is generated in the spindle motor and the forced stop operation is executed (step S104). Thereafter, the eject processing is performed to eject the cartridge of the MO disk out of the MO disk drive. Details of the eject processing will be described later.

Also when it is judged in the step S101 that the stop state is present, it is judged whether or not the sleep processing is being performed (step S107), and on judging that the sleep processing is being performed, the stop operation ends as it is. On the other hand, when it is judged that the preparations are being made for the eject processing, the following eject processing is performed.

In the eject processing, first the eject motor is started from its home position (step S108), and an eject motor position is repeatedly detected at a predetermined period. When the eject motor starts moving from the home position, a state in which the home position is undetected is obtained. While the home position is undetected less than the defined number of times (step S109: N), the eject motor hardly moves from the home position. Subsequently, when the number of non-detection times fails to reach the defined number even after an elapse of a defined time (step S110: Y), a trouble occurs in a detection sensor or the eject motor and an error processing is performed.

When it is judged in the step S109 that the number of times when the home position is undetected reaches the defined number, the eject motor normally starts rotating, and the home position is detected for every rotation. While the number of detection times of the home position fails to reach the defined number (step S111: N), an ejection amount of the cartridge of the MO disk is insufficient. Subsequently, when the number of detection times of the home position fails to reach the defined number even after the elapse of the defined time (step S112: Y), the detection sensor trouble or an eject motor halfway stop occurs and the error processing is performed.

When it is judged in the step S111 that the number of home position detection times reaches the defined number, the cartridge is sufficiently ejected, the drive force is therefore generated in the eject motor for reverse rotation (step S113), the eject motor is stopped (step S114), and the eject processing ends.

Here, as a method of judging whether or not the spindle motor is in the rotating state in the step S101, judgment based on a time elapsed from when the spindle-on signal to the spindle motor driver is stopped, or judgment based on a measured value of the spindle motor rotational speed is considered.

Figure 9:
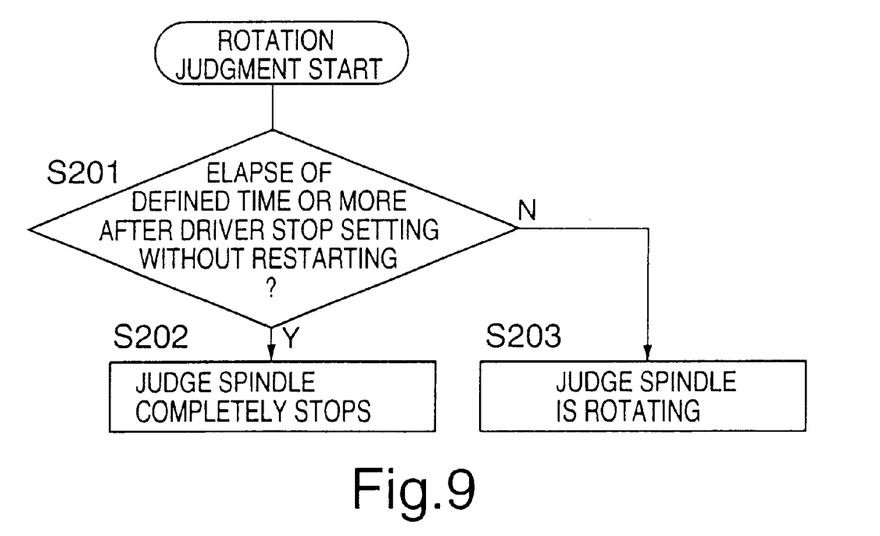
FIG. 9 is a flowchart of a judgment processing of judging whether or not a rotating state is present based on an elapsed time.

FIG. 9 is a flowchart of a judgment processing of judging whether or not the rotating state is present based on the elapsed time.

When the judgment processing starts, it is judged whether or not the defined time (e.g., 20 seconds) or more has elapsed without emitting the spindle-on signal again after stopping the spindle-on signal to the spindle motor driver and stopping the driving by the spindle motor in the forward direction (step S201). Subsequently, when it is judged that the defined time or more has elapsed, it is judged that the spindle motor is in the stop state (step S202). When it is judged that the defined time fails to elapse, it is judged that the spindle motor is rotating (step S203).

Figure 10:
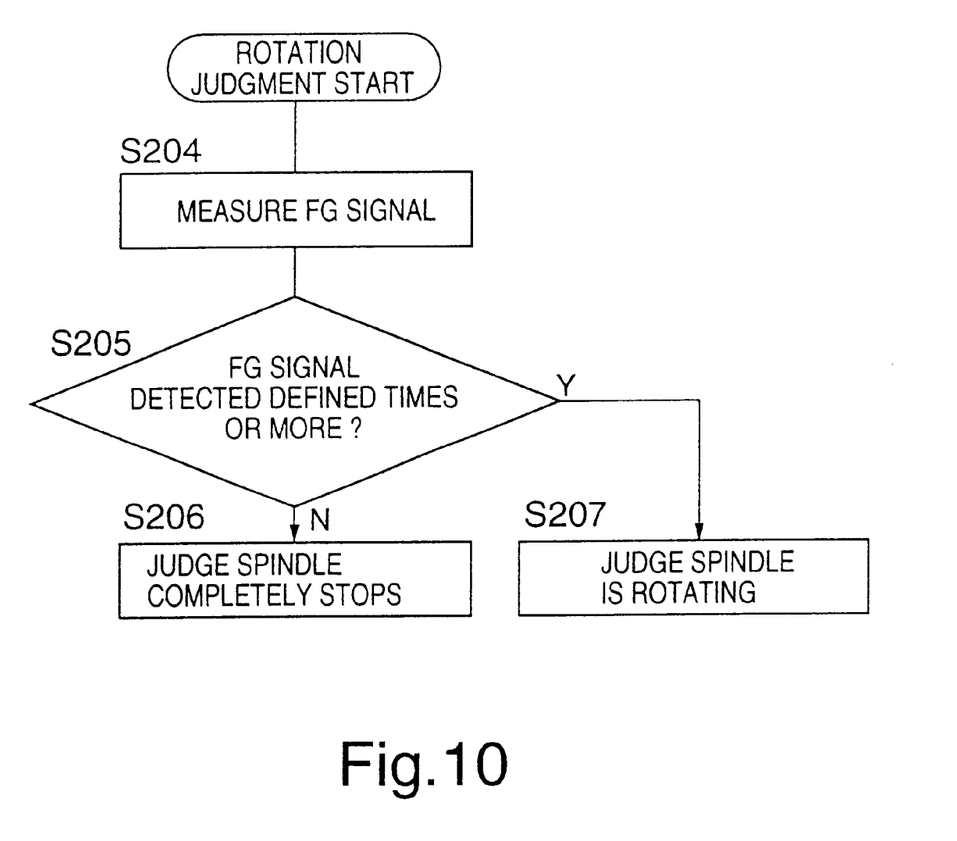
FIG. 10 is a flowchart of the judgment processing of judging whether or not the rotating state is present based on the rotational speed.

FIG. 10 is a flowchart of the judgment processing of judging whether or not the rotating state is present based on the measured value of the rotational speed.

When this judgment processing starts, the FG signal from the spindle motor driver is measured (step S204), and it is judged whether or not the FG signal is detected the defined number of times or more within a predetermined time (e.g., once or more for one second) (step S205). Subsequently, on judging that the signal is detected less than the defined number of times, it is judged that the spindle motor is in the stop state (step S206), and on judging that the signal is detected the defined number of times or more, it is judged that the spindle motor is rotating (step S207).

Figure 11:
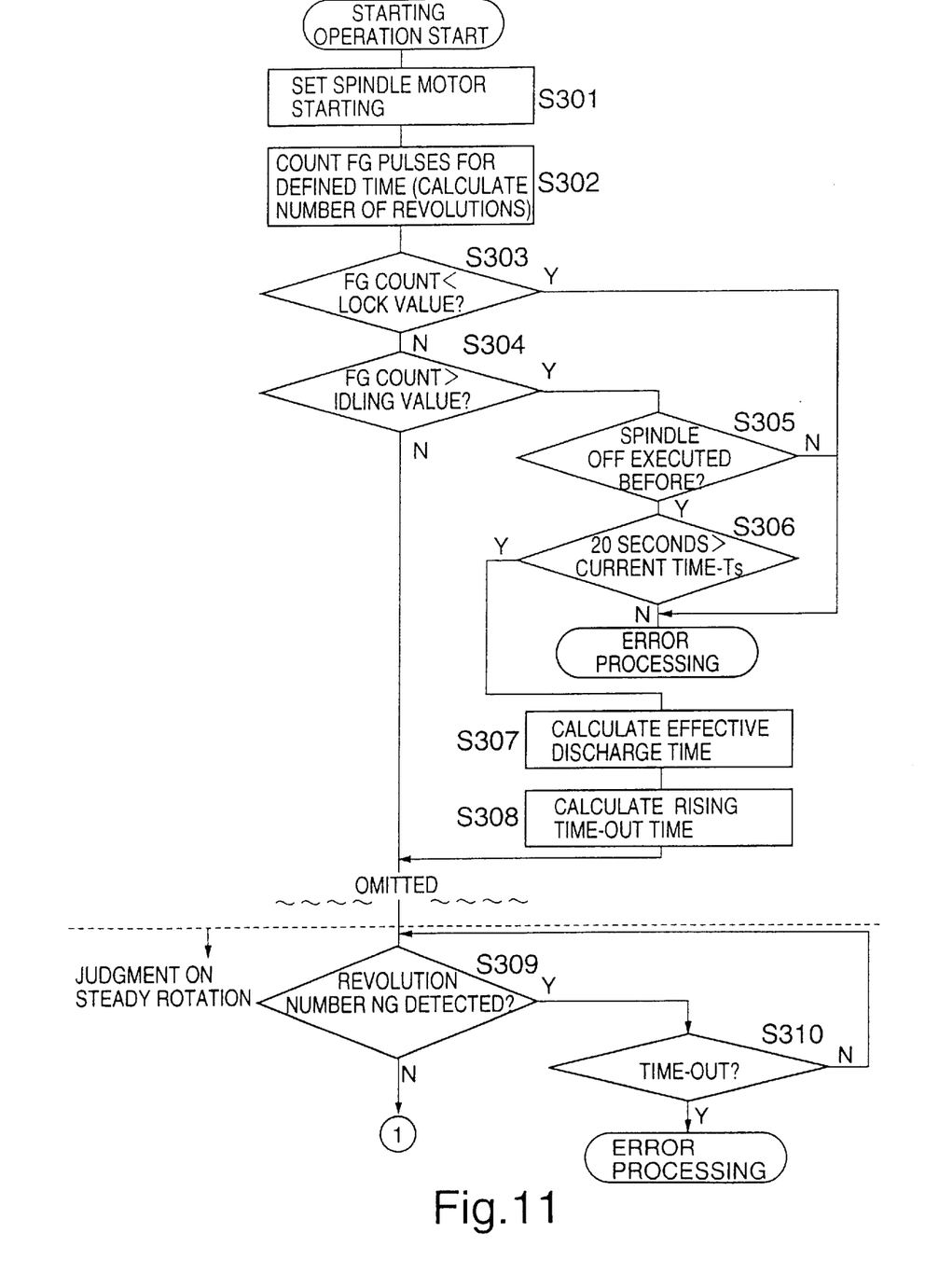
FIG. 11 shows a former step part of a flowchart of a starting operation of a spindle motor.
Figure 12:
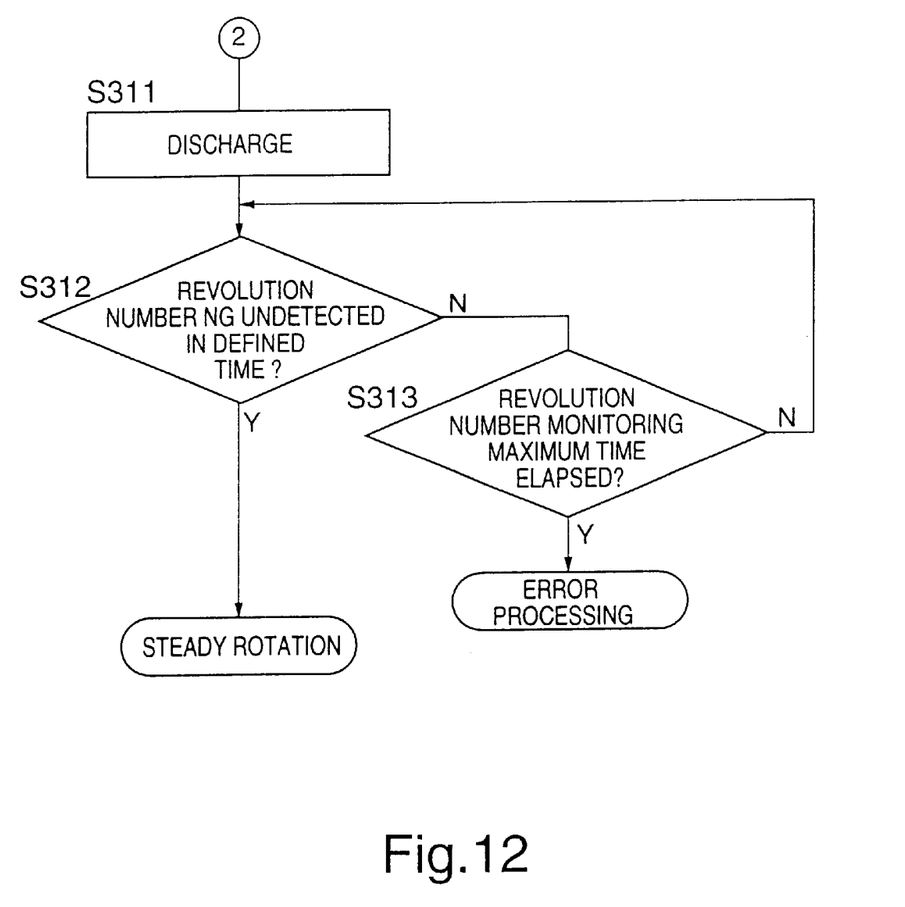
FIG. 12 shows a latter step part of the flowchart of the starting operation of the spindle motor.

FIGS. 11 and 12 are flowcharts of a starting operation of the spindle motor, and the flow continues to step S311 of FIG. 12 from step S309 of FIG. 11.

When the starting operation is started, first the spindle-on signal is inputted to the spindle motor driver, the starting of the spindle motor is set (step S301), and the number of revolutions of the spindle motor is substantially calculated by counting pulses of FG signals from the spindle motor driver for the defined time (e.g., 420 ms) (step S302).

When a pulse count of the FG signals is less than a predetermined lock value (e.g., nine times) (step S303: Y), even with the setting of the starting of the spindle motor, the number of revolutions of the spindle motor fails to rise and the error processing is performed. Moreover, when the pulse count of the FG signals exceeds a predetermined idling value (e.g., 95 times) (step S304: Y), the spindle motor probably idles, and the error processing is therefore performed, except a case in which the spindle motor has been turned off and the natural stop operation has been performed before (step S305: Y) and a difference between the current time and a time backed up to the variable Ts is less than 20 seconds (step S306: Y).

When the elapsed time after the previous natural stop operation is less than 20 seconds (step S305: Y and step S306: Y), in order to perform the restarting from the rotating state by inertia after the natural stop operation, an effective time length for performing discharge as described later is calculated (step S307).

Figure 13:
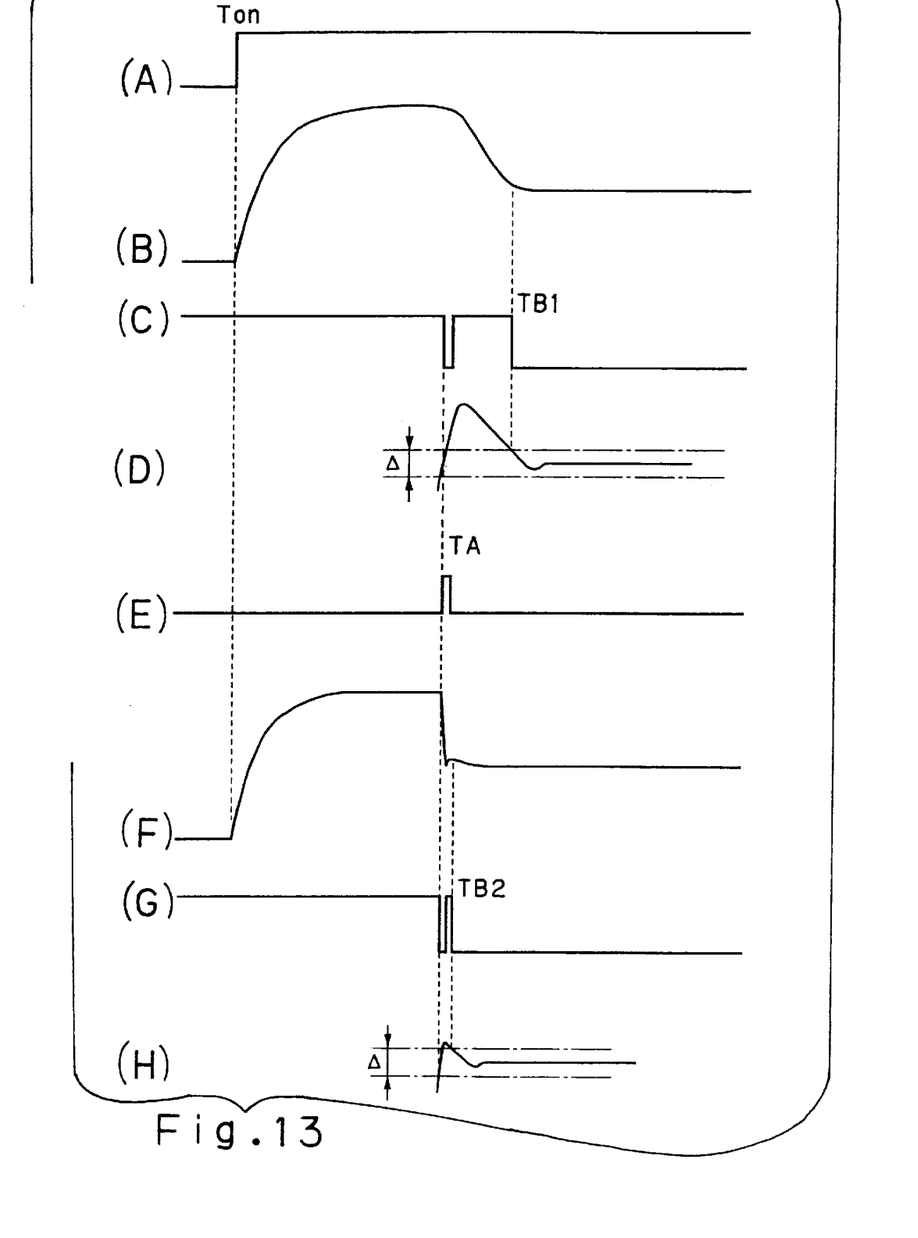
FIG. 13 shows explanatory views of discharge.

FIG. 13 shows explanatory views of the discharge.

The abscissa of each of parts(A) to (H) of FIG. 13 indicates time.

Part(A) of FIG. 13 shows the spindle-on signal inputted to the spindle motor driver. The spindle-on signal is inputted at time Ton to start the spindle motor.

The drive current supplied to the spindle motor 40 from the power source 38_1 shown in FIG. 3 is controlled by increasing/decreasing a charge amount of a controlling charge for so-called acceleration of the power source 38_1 by a charge pump in the commutation 38_2.

Part (B) of FIG. 13 shows the change of the controlling charge. After the spindle motor is started at the time Ton, the amount rapidly rises and reaches a maximum charge amount, and the maximum charge amount is kept until the rotational speed of the spindle motor 40 reaches a predetermined steady rotation range.

Part (D) of FIG. 13 shows the spindle motor rotational speed, and also shows a steady rotation range Δ. After the spindle motor is started at the time Ton, the rotational speed does not reach the steady rotation range Δ until time TA.

Part(C) of FIG. 13 shows the Ready signal outputted from the spindle motor driver. The signal is at 'L' when the rotational speed shown in part (D) of FIG. 13 is in the steady rotation range Δ.

When the spindle motor rotational speed shown in part (D) of FIG. 13 reaches the steady rotation range Δ at the time TA, the controlling charge shown in part (B) of FIG. 13 reaches the maximum charge amount, the charge amount is then reduced by the charge pump, but the rotational speed largely exceeds the steady rotation range Δ before sufficient drop of the charge amount, and time TB1 at which the speed settles in the steady rotation range Δ is much behind the time TA. Therefore, the discharge is performed to rapidly reduce the charge amount of the controlling charge.

Part(E) of FIG. 13 shows a discharge timing. The discharge is performed only for a short time immediately after the time TA.

Part(F) of FIG. 13 shows the change of the controlling charge when the discharge is performed. The charge amount rapidly drops immediately after the time TA.

Part(G) and part(H) of FIG. 13 show the Ready signal and the spindle motor rotational speed, respectively, when the discharge is performed. Since the discharge is performed, an amount by which the spindle motor rotational speed exceeds the steady rotation range Δ after the time TA is slight. As a result, the spindle motor rotational speed settles in the steady rotation range Δ at time TB2 which is only a short time behind the time TA.

In order to sufficiently fulfill such discharge function, a discharge continuation time needs to be appropriately set in accordance with the spindle motor which the discharge effectively functions is calculated based on the spindle motor rotational speed. By performing the discharge only for the appropriate effective discharge time calculated in this manner, the spindle motor rotational speed quickly settles in the steady rotation range Δ.

Thereafter, a time-out time for waiting for the spindle motor rotational speed to rise is also calculated based on the spindle motor rotational speed (step S308).

Time T1, T2 shown in FIG. 5 indicates a time which the time-out time starting from the time Ton reaches. With respect to the time-out time (difference between time T1 and time Ton) in the restarting from the stop state, the time-out time (difference between time T2 and time Ton) in the restarting from the rotating state is set to be short. In order to appropriately detect and handle an error during restarting, it is preferable to set the time-out time in accordance with the rotational speed in the time Ton when the restarting is started, and by setting the appropriate time-out time, time required for the restarting can be reduced.

After the time-out time is calculated in the step S308 of FIG. 11, a processing (on and after the step S309) of judging whether or not the spindle motor settles in the steady rotation range is executed.

First, after the time Ton, while it is detected by the Ready signal that the number of revolutions is outside the steady rotation range (step S309: Y), the number of revolutions of the spindle motor is rising. When the time-out time calculated in the step S308 elapses (step S310: Y), a trouble occurs in the rising and the error processing is performed.

When it is detected that the number of revolutions is within the steady rotation range before the elapse of the time-out time (step S309: N), the discharge is executed for the effective time calculated in the step S308 (step S311). Thereafter, the flow is on standby until it is detected that the number of revolutions is constantly within the steady rotation range over the defined time, that is, until it is detected that the number of revolutions settles within the steady rotation range (step S312). When it is detected that the number settles in the steady rotation range, the starting operation ends. On the other hand, when standby time exceeds a maximum standby time for monitoring stability of the number of revolutions (step S313: Y), the error processing is performed.

Additionally, when it is judged in the step S304 of FIG. 11 that the count value of FG signal is the predetermined idling value or less, the starting from the stop state is performed, the flow shifts as it is to a processing of judging whether or not the spindle motor has settled in the steady rotation range (on and after the step S309), and the rising time-out time and effective discharge time calculated beforehand for the starting from the stop state are used to perform the processing on and after the step S309.

Finally, a calculation processing of the rising time-out time and effective discharge time in the steps S308 and S309 will be described.

Figure 14:
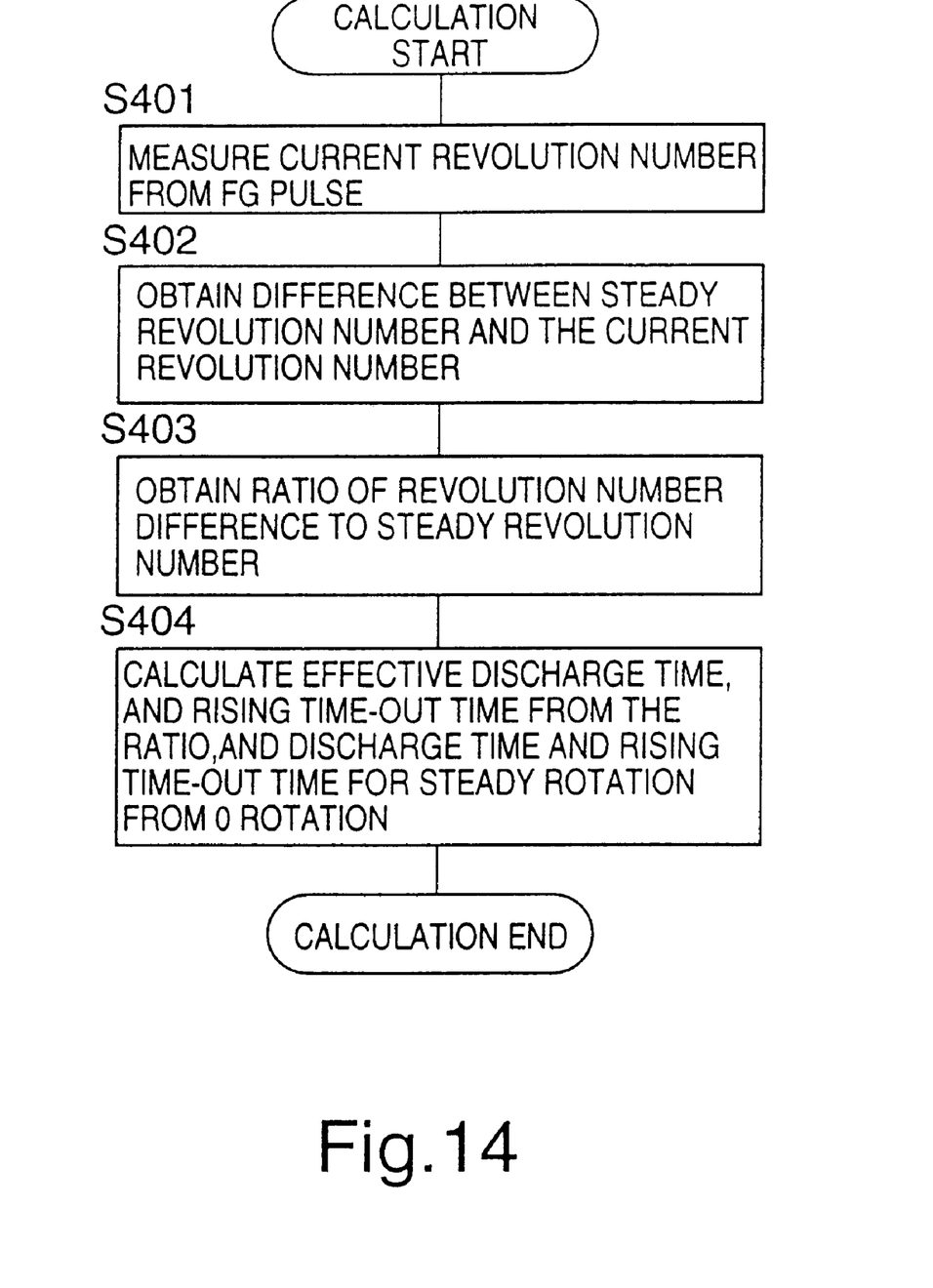
FIG. 14 is a flowchart of a calculation processing of a rising time-out time and an effective discharge time.

FIG. 14 is a flowchart showing the calculation processing of the rising time-out time and effective discharge time.

When the calculation processing is started, first, FG signal pulses are counted and the current number of revolutions is measured (step S401), a difference between a target revolution number of steady rotation and the current revolution number is obtained (step S402), and a ratio of the difference to the steady rotation target revolution number is obtained (step S403).

Thereafter, the ratio, and the effective discharge time and rising time-out time for the starting from the stop state are used to calculate those for the starting from the rotating state.

The effective discharge time and rising time-out time calculated in this manner are used for operation control of the spindle motor in the steps S310 and S311. As a result, the rotation starting time is short in the rising to the steady rotation state after the natural stop operation by the sleep processing, and a ready state (access standby state) can quickly be obtained.

Additionally, the aforementioned embodiment is an application example of the present invention to the MO disk drive, but the information storage apparatus of the present invention can also be applied to the disk drives other than the MO disk drive, such as a CD drive, FD drive and hard disk drive, and further to an information storage apparatus using card-like information storage medium.

As described above, according to the information storage apparatus of the present invention, the current consumption in the spindle motor or the like is low. Therefore, it is possible to construct the portable computer system which can be used for a long time by a battery or a galvanic cell.

What is claimed is:

1. An information storage apparatus for holding an information storage medium in a predetermined position and rotating the information storage medium in a predetermined direction to perform at least information reproduction with respect to the information storage medium, said information storage apparatus comprising:

a driver for driving said information storage medium in said predetermined direction;

a brake for forcibly stopping rotating said information storage medium; and a controller for selectively executing a forced stop operation in which said driver stops driving the information storage medium and said brake forcibly stops rotating the information storage medium, and a natural stop operation in which said driver only stops driving the information storage medium;

wherein said controller receives a predetermined starting signal and allows said driver to start driving said information storage medium, and in a case which the controller allows said natural stop operation to be executed and subsequently receives said starting signal before said information storage medium stops, the information storage medium fails to stop and the controller allows said driver to start driving the information storage medium.

2. The information storage apparatus according to claim 1 wherein when said information storage medium fails to stop and said controller allows said driver to start driving the information storage medium, the controller performs a control on said driver in accordance with a rotational speed of the information storage medium.

* * * * *